United States Patent [19]
Ryan

[11] 3,958,053
[45] May 18, 1976

[54] ARTICLES HAVING INTEGRAL TRANSPARENT OR TRANSLUCENT PANELS

[75] Inventor: James Ernest Ryan, Knebworth, England

[73] Assignee: Imperial Chemical Industries Limited, London, England

[22] Filed: June 3, 1974

[21] Appl. No.: 475,960

Related U.S. Application Data

[63] Continuation-in-part of Ser. No. 260,728, June 8, 1972, Pat. No. 3,832,428.

[52] U.S. Cl. ............................... 428/159; 428/170; 428/171; 428/172; 428/305; 428/306; 52/306; 264/48
[51] Int. Cl.² ........................................... B32B 3/30
[58] Field of Search .................... 161/5, 6, 3.5, 160, 161/161, 413, 409, 109, 113, 116; 264/48; 52/204, 306, 307; 428/157–160, 170, 203, 306, 913, 71, 69, 171, 172, 305

[56] References Cited
UNITED STATES PATENTS

3,432,380  3/1969  Weber ................................ 161/409
3,802,949  4/1974  Brown, et al. ......................... 264/48

*Primary Examiner*—William J. Van Balen
*Attorney, Agent, or Firm*—Cushman, Darby & Cushman

[57] ABSTRACT

Shaped articles such as doors, internal partitions and other building elements, are composed of a cellular thermoplastic material, and have at least one integral non-cellular transparent or translucent panel. The thermoplastic material is preferably a water-extended polymer, and may contain a colouring agent dispersed therethrough, e.g. a dye or pigment, or may be printed. The panels may be embossed to provide a visible decoration. Compared with equivalent articles having separately glazed panels as previously known, the present integral panels remove the need to fit and secure separate panes, e.g. of glass, during assembly, they provide a more unified appearance, and give designers greater scope in enabling them to incorporate panel shapes which would previously have been impossible or uneconomic to use.

10 Claims, 12 Drawing Figures

ARTICLES HAVING INTEGRAL TRANSPARENT OR TRANSLUCENT PANELS

CROSS REFERENCE TO RELATED APPLICATION

This application is a continuation-in-part application of Ser. No. 260,728, filed June 8, 1972 now U.S. Pat. No. 3,832,428.

BACKGROUND OF THE INVENTION

Shaped articles such as doors, internal partitions and other building elements, wherein glazing panels within an opaque surround were required, were previously formed from some opaque structural material, such as wood or hardboard-covered wood frame, with separately formed glazing panels e.g. of glass secured within an aperture in the opaque material. Hence in addition to the formation and finishing of the opaque surround and its apertures, it was necessary to shape, fit and secure each panel of the glazing material as additional fabrication steps. The appearance of the finished articles was generally that of a collocation rather than a unified structure and for most of such articles that collocative appearance was to their aesthetic detriment. The scope which the designer had for providing new shapes of panel to give visual interest or optimisation of strength, was restricted by the inability of rigid beading (or like glass-retaining means) to cope with tight curves, and by the high cost of providing intricate panel shapes in that manner.

SUMMARY OF THE INVENTION

The invention provides a shaped article, such as a door, internal partition or other building element, composed of a cellular thermoplastic material which by its cellular nature is opaque, the article having at least one integral non-cellular transparent or translucent panel. The cellular thermoplastic material is preferably a thermoplastic water-extended polymer which for most applications will preferably be substantially free from water. With water-extended polymethyl methacrylate for example, loss of the cell-forming water to the atmosphere will occur automatically unless steps are taken to seal in the water, but it is generally preferred to speed up this water loss by gentle heating. When using thermoplastic materials like polymethyl methacrylate, the panels will be transparent because of the removal of the cellular structure of the material, but where a translucent panel is desired, suitable fillers such as glass fibres and/or pigments may be incorporated into the polymer in sufficient quantities to produce the desired amount of scatter. A method of forming the cellular water-extended polymer, removing the water, and thereafter applying heat and pressure to form the panel is described and claimed in the copending application Ser. No. 260,728. The selection of a water-extended polymer as the opaque material is preferred because the process of forming the cellular structure by using droplets of water, is one which enables very fine cell structures to be readily and consistently produced.

For most articles, it is preferred to also form on at least a part of the exposed surface of the article, an integral non-cellular skin. This may be formed by pressing the dry surface with a plate heated above the softening point of the thermoplastic material so as to fuse a layer thereof and remove its cellular structure. It will be realised, however, that the depth of fusion must be controlled, otherwise further translucent or transparent paneling may also be produced in positions where it is not desired.

The thickness of the translucent or transparent panel when formed by collapsing the cellular structure of an area of a sheet of the cellular material without the addition of further material, must necessarily be less than that of the unpressed sheet. By pressing both sides of the sheet with embossed dies, the panel may be formed intermediate the level of the two surfaces, or by using an embossing die on one side only the panel may lie flush with the other side. This latter may be particularly effective when at least one of the surfaces is provided with a non-cellular skin and the panel lies flush with that skin so as to form a smooth continuous surface. Since the formation of both the panel and the skin require pressure from a die of about the same elevated temperature, it is generally preferred to carry out the two processes in a single operation. Thus by applying to each side of a sheet of cellular material a heated flat plate having a raised area the shape of the desired panel, initial pressure starts to form the panel until the flat areas contact the sheet whereupon continued pressure forms the surface skin and further reduces the sheet thickness in forming the panel. Thus articles according to the present invention may be provided with an attractive and durable surface finish and any number of panels (whether of intricate or plain design) in a single pressing operation.

The panels themselves may be embossed and provided with any desired cross section subject to the thickness at any point not exceeding that for which there is sufficient of the thermoplastic material to provide the shape in non-cellular form, a limited amount of laterial flow being possible. Thus for example the panel may have an enclosed motif only visible using back lighting and suitable for intermittently shown advertising displays or warning lights, or the panel may be enbossed so as to form a lense or plurality of prisms so as to direct light passing through it. In this way articles such as spot lights for domestic lighting may be provided with front surfaces having integral light-controlling panels. By providing the panel with a smooth surface flush with the remainder of the front surface of the article, such back-lit panels may provide considerable visual impact.

The present invention does enable articles to be produced which overcome or mitigate against problems which have been associated with prior art panelled articles for so long and which have been outlined hereinabove. Thus for example even a plurality of intricately shaped panels may be formed in a single pressing operation to produce the present articles, and indeed such panel formation may even be carried out at the same time as the surface finish is provided, a single pressing operation carrying out both processes together. This contrasts favourably with the more labour-intensive shaping, fitting and securing of each individual panel to each preformed aperture of the previous articles. The integral nature of the panels with respect to the remainder of the article may also provide a more unified appearance which can be aesthetically more pleasing. Moreover, by releasing from the design criteria any requirement to use semi-rigid beading or any necessity for avoidance of repeated intricate shapes of panels in commercial mass produced designs, the designer is given greater freedom to provide more structurally efficient or more aesthetically pleasing designs.

SUMMARY OF THE DRAWINGS

Since one of the commercial advantages of the present articles is that by simplifying the production of the panels to a single pressing operation the cost of the articles can include a lower contribution of labour charges, we provide details of the production of various articles rather than merely describe the articles themselves. Accordingly, the drawings (which are not to scale), illustrate the articles in the following Examples. In the drawings.

Figure 1:
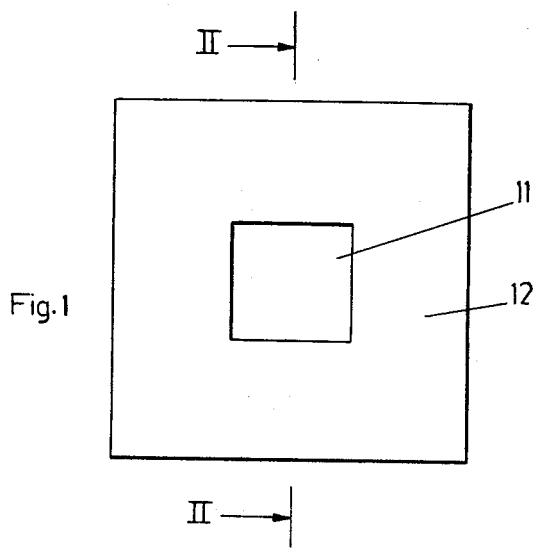
FIG. 1 is an elevation of a cupboard front produced as described in Example 1.

In the following Examples, the reference numerals refer to those on the drawings as summarised above.

EXAMPLE 1

A water-in-oil emulsion having a ratio of water to oil of approximately 2:1 was prepared by slowly adding the water with constant stirring to an oil phase comprising methyl methacrylate containing 10% by weight of polymethyl methacrylate (to produce a more viscous syrup having a shorter gel time), using as emulsifying agent 2% by weight of a commercial crystalline polyester resin consisting of 2/1 propoxylated bisphenol A/propylene glycol on maleic anhydride, together with 2% by weight of triethanolamine. The oil was catalysed by 2% by weight of benzoyl peroxide (added in diluted form as 4% by weight of a mixture of benzoyl peroxide and an inert filler in equal proportions by weight) together with 1.6% by weight of dimethyl-p-toluidine.

The initiated emulsion was then poured into a mould about 30 cm square, to a depth of approximately 6 mm. The emulsion was allowed to cure without any heat being applied, the cure time being about 25 min. After a period of about 30 min, the hardened article was removed from the mould, the article comprising a rigid slab of water-filled cellular material. The slab was then left overnight in an oven at a temperature of 80°C, under vacuum, in order to remove the bulk of the trapped water. On its removal from the vacuum oven, the slab comprised a cellular material having very even small cells filled with air.

Figure 2:
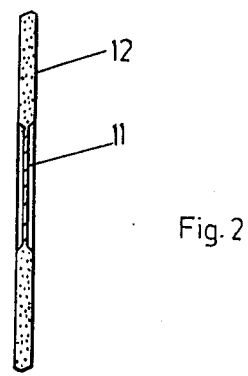
FIG. 2 is a section along the line II—II of FIG. 1.

The slab was then placed between two 10 cm square plates having temperatures of about 150°C. The plates were pressed against the opposing surfaces of the slab with a pressure of 320 psi for about 10 mins to produce a cupboard front as shown in FIGS. 1 and 2, which had a panel 11 of reduced thickness in the centre of the door. The original thickness of about 6 mm was reduced to approximately 2 mm, with a smooth transition at the edges. While the cellular part 12 of the door appeared to be completely opaque, the thinner noncellular panel 11 was substantially transparent, and small newsprint viewed through the panel could be seen distinctly.

EXAMPLE 2

Figure 3:
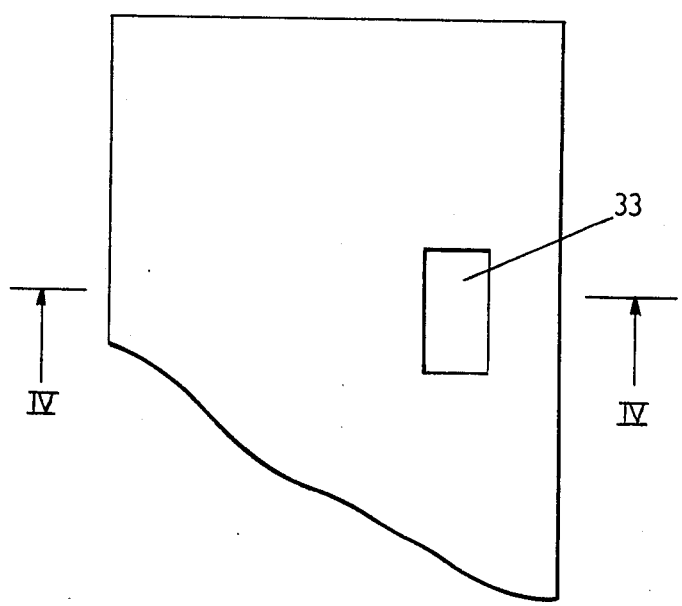
FIG. 3 is an elevation of part of an office door produced as described in Examples 2 and 3.
Figure 4:
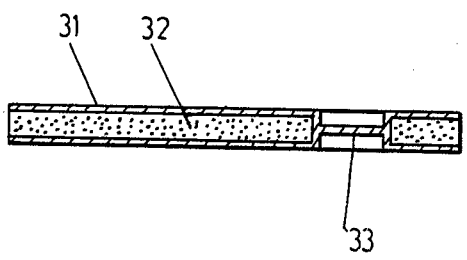
FIG. 4 is a section along the line IV—IV of FIG. 3.

An office door having a small transparent panel and as shown in FIGS. 3 and 4, was cast using a cold setting recipe. The continuous oil phase of the emulsion consisted of 2% by weight of "Atlac" 382 E (a dipropoxylated bisphenol A fumarate (1:1) polyester marketed by Honeywill-Atlas Limited, and having an acid number of 12), 2% by weight of triethanolamine, 2% by weight of benzoyl peroxide (added as 4 of a 50 percent solution), 0.8% by weight of dimethyl-p-toluidine, and methyl methacrylate up to the total 100 weight %. Water was added with continuous stirring using an 8 cm diameter poppy-head dispersator to produce a stable emulsion containing 75% by weight of water as the disperse phase, the remainder being the above oil phase.

The initiated emulsion was then poured into a rectangular mould having the dimensions of the desired door, to a depth of about 6 cm and left for about 45 min, after which time the methyl methacrylate had cured. The sheet was removed and dried in an oven for 2 days at 95°C and a further 15 days at 100°C. After drying, the sheet was pressed between two flat plates at 160°C and 200 psi for about 10 s. A skin 31 was formed on both sides of the opaque sheet 32, and the overall thickness of the sheet was reduced to about 4 cm. A small panel approximately 10 × 20 cm was formed by pressing between two dies of the desired size and maintained at 175°C. Both dies were advanced into the sheet with a pressure of 250 psi at the die face, for 3 min, and then cooled to harden the polymer. On withdrawal of the dies after cooling, a very clear transparent panel 33 was left. The panel had a thickness of about 5 mm and was located about half way through the sheet, with the depressions left in both sides having sharply defined walls which appeared to be substantially orthogonal to the glazed surface of the sheet.

EXAMPLE 3

A door similar to that of Example 2 was formed in the same mould, but using a hot-setting recipe. The continuous oil phase consisted of 2% by weight of Atlac 382 E, 0.1% by weight of sodium hydroxide, 0.3% by weight of 2,4-dichlorobenzoyl peroxide, 10% by weight of 2-ethyl hexyl acrylate, and the balance to 100 weight % of methyl methacrylate. The oil was emulsified with warm water to give an emulsion at a temperature of 46°C containing 75% by weight of water as the disperse phase. The emulsion was immediately poured into the mould, again to a depth of 6 cm, and then placed in an oven at 55°C for about 3 hours. After removal from the mould, the resultant sheet was dried in an oven at 95°C for 1 day and then 110°C for 11 days. The cell structure appeared to be slightly coarser than that of the previous Example.

The blank produced was more difficult to glaze than that of Example 2, but by increasing the pressure to 700 psi, and the temperature to 170°C, a good clear skin 31 was again formed in 2 min. Once glazed, however, it appeared that the panel 33 could be formed as easily as that in the previous Example, again using a die temperature of 175°C and a pressure of 250 psi for 3 min before cooling. The resultant panel was very similar to that produced in Example 2.

EXAMPLE 4

Figure 5:
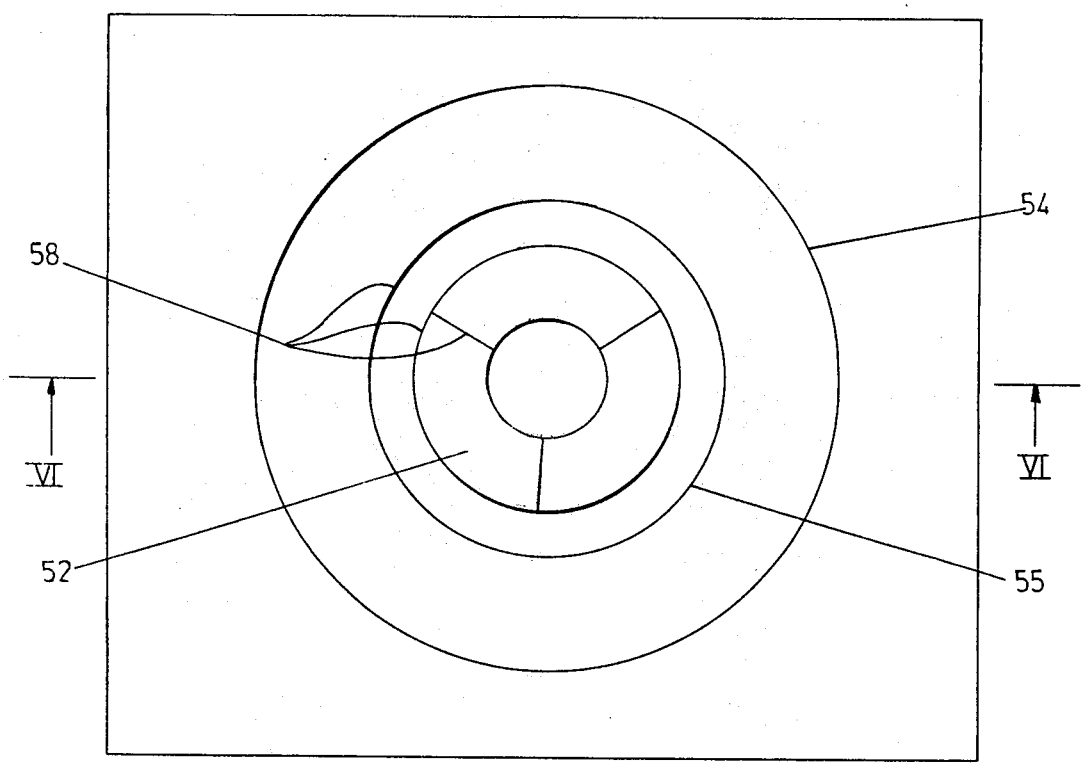
FIG. 5 is an elevation of part of a lighting box front as described in Example 4.
Figure 6:
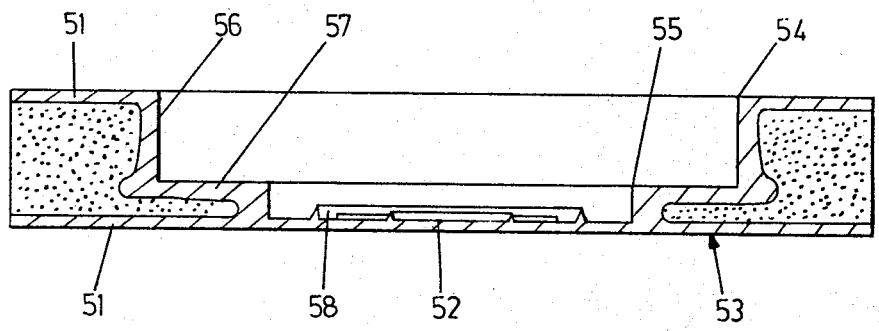
FIG. 6 is a section along the line VI—VI of FIG. 5.
Figure 7:
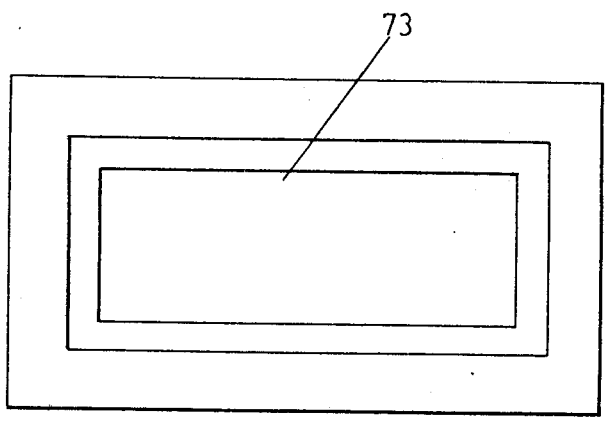
FIG. 7 is an elevation of a sample sheet used to test the process prior to the formation of a room door having translucent panels.
Figure 8:
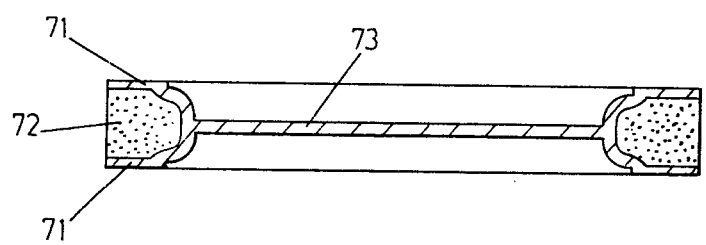
FIG. 8 is a section along the line VIII—VIII of FIG. 7.

This example describes the formation of the article illustrated in FIGS. 5 and 6, and is provided to illustrate the formation of a panel flush with one surface of a sheet, and also to illustrate an embossed panel.

Using the cold setting recipe of Example 2 with the water content of the emulsion reduced to 70% by weight, the emulsion was cast to form a sheet a little over 3 cm thick, but because the sheet was thinner than that of Example 2 a much shorter drying cycle could be used, being 95°C for about 12 hours and a further 4 days at 100°C. A surface skin 51 about 2 mm thick was formed on both surfaces, reducing the overall sheet thickness to about 2.3 cm.

The panel-forming dies for the two sides of the sheet were dissimilar, one being a flat supporting plate while the other, which will be referred to as "the die," was of much smaller cross-sectional area, the die being arranged to press into a blank supported on the plate. The die consisted of two coaxial cylindrical portions, an end portion having a diameter of 6 cm and a length of 6 mm, and a second portion 10 cm in diameter, integral with the end portion, the diameter of the die changing from one portion to the next as a sharp step orthogonal to the surfaces of the cylinders. The end face of the end portion had an engraved pattern in the form of V sectioned channels of varying depths within the approximate range of 0.5–2 mm. With the blank at ambient temperature, and the die at 175°C, the die was pressed into the blank with a pressure of 250 psi, the total force being increased as required when the step reached the surface of the blank. After 3 min the die was cooled to harden the polymethyl methacrylate.

The panel 52 so formed was continuous and flush with one surface of the blank on the side 53 supported by the plate, while in the other surface was a stepped depression through to the panel. Both the rim 54 of the depression and the edge 55 of the step were sharply defined, with the cylindrical sides 56 of the depression apparently having reproduced faithfully the sides of the cylindrical portions of the die. The surface 57 of the step had a noticeable increase in the thickness of the glazed skin. The panel was transparent with a slight haze, and the embossed pattern 58 was faithfully reproduced in transparent material although when back lit this appeared as dark lines due to their shape. The panelled sheet thus produced was useable as a lighting box front, but we have subsequently formed a plurality of similar small panels in a larger coloured sheet to form an attractive external door. Similar designs may be used for partitioning in bars and resturants, for example.

EXAMPLE 5

This experiment was carried out to illustrate the use of fillers in forming translucent panels. To the oil phase of Example 3 was added about 1% by weight of chopped glass rovings, and this was extended in an emulsion containing 70% by weight of water as the disperse phase. A blank, 4 cm thick was cast from the emulsion using the same cycle as in Example 3, and then dried. A skin 71 was formed in both surfaces of the opaque blank 72, to reduce the overall thickness to 3 cm. Using two dies maintained at 175°C and shaped to produce a flat panel with integral imitation beading at its edges, the blank was pressed from both sides with a pressure of 250 psi to form a panel 3 mm thick.

The panel 73 was translucent and no distant objects could be distinguished through it. However, fine print held against the reverse face of the panel could clearly be read. The glass fibres could be clearly distinguished, and provided an attractive appearance. This experiment showed that compositions containing glass fibres were suitable for producing doors, e.g. office or domestic doors, or internal partitions having substantially translucent integral panels so as to allow entry of light while providing reasonable privacy.

EXAMPLE 6

Figure 9:
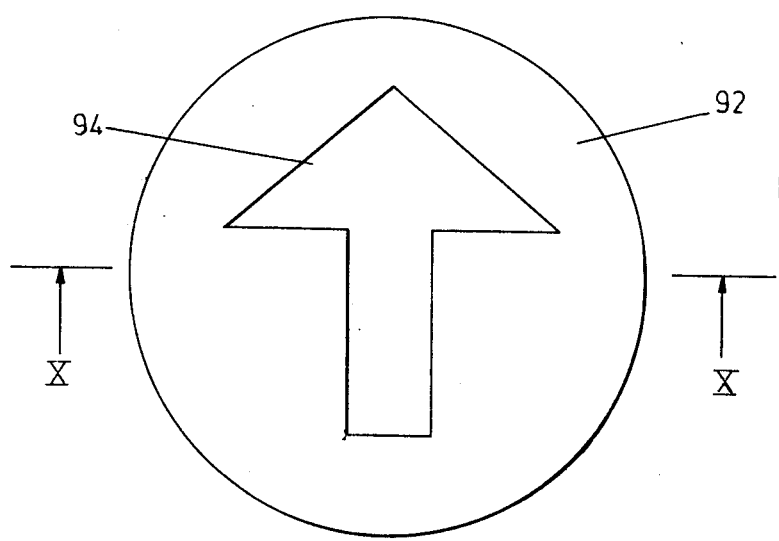
FIG. 9 is an elevation of the front of a back lit indicating sign.
Figure 10:
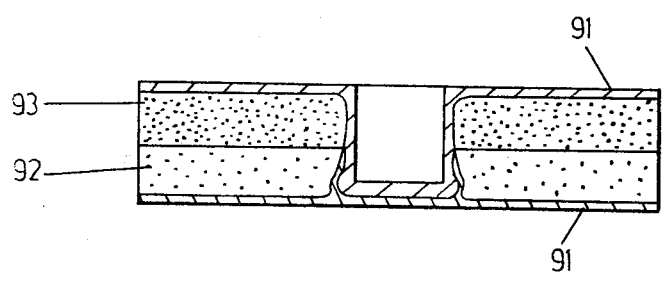
FIG. 10 is a section along the line X—X of FIG. 9.

This example is provided to illustrate the uses of laminates with transparent or translucent panels in direction signs (e.g. as shown in FIGS. 9 and 10), advertisements and the like.

Two sheets of unglazed, dried water-extended polymer were produced using the recipe and cycle of Example 3, except that a red monomer-soluble die was added to one of the emulsions. The two sheets were placed together, and their outward faces glazed. The resultant glazed pair of sheets had a total thickness of about 4 cm with glazed skins 91 of about 2 mm, the two sheets having approximately the same thickness.

In a similar manner to that of Example 4, the panel was formed using a supporting plate and a die shaped as an arrow with a 3 cm wide shaft. The sheet without the dye 92 was placed on the supporting plate with its glazed skin downwards, and the red sheet 93 on top with its glazed skin uppermost. The die, maintained at 175°C, was pressed downwards with a pressure of 250 psi, for 3 min, cooled for a further 10 min and withdrawn.

When viewed from the side of the uncoloured material 92, with illumination behind the sheets, the red arrow 94 appeared in the middle of a white opaque area, the panel being flush with the surface of the uncoloured (white) sheet. The two sheets were firmly bonded together. The opaque area was slightly discoloured by free radical absorbers in the polyester, but this may be minimised by initially washing with aqueous sodium hydroxide.

EXAMPLE 7

This example describes the formation of a domestic external door having a striking decorative appearance on account of integral translucent panels according to the present invention.

The door was made from a water-extended thermoplastic polymer obtained as in the previous examples by curing a water-in-oil emulsion. The oil phase was 20 parts by weight of methyl methacrylate, 0.8 parts by weight of an emulsifier (the emulsifier being a solution comprising 75 wt % of a poly(ethylene glycol)-containing alkyd, 5 weight % xylol and 20 wt % white spirit), 0.75 parts by weight of a 75 weight % solution of tert-butyl perpivolate in white oil, 1 part by weight of methacrylic acid, 0.1 parts by weight of a dispersion of a cherry red-coloured pigment in xylol, and 0.2 parts by weight of 6 mm long, vinyl silane-treated glass fibres. The emulsion was formed by adding 80 parts by weight of warm water to the oil phase and shearing the mixture with a poppy-head dispersator, the water temperature being adjusted to give an emulsion temperature of 47°C. The emulsion was poured into a lagged box subdivided by spacers to provide six compartments approximately 78.5 inch × 33 inch × 3 inch, and then left to cure in the box overnight. Next day, the six water-filled panels were transferred from the box to an air oven at 130°C, where they remained for 4 days to effect thorough drying.

Each of the dried sheets of cellular material so produced had dull porous surfaces, and were glazed while forming the panels in a heated press. The two plates of the press had plane smooth surfaces with two sets of parallel ribs rising above the planar surface by 0.75 inch. With the plates heated to 175°C, a panel was placed between the two plates which were brought towards each other so as to apply to the panel surface a constant pressure of 250 psi until the distance between the planar surfaces was 1.75 inches, the ribs of the two plates being matched up whereby the distance between the ribs of the two plates was finally only 0.25 inch. The plates were then cooled to harden the intervening material, and then withdrawn.

Figure 11:
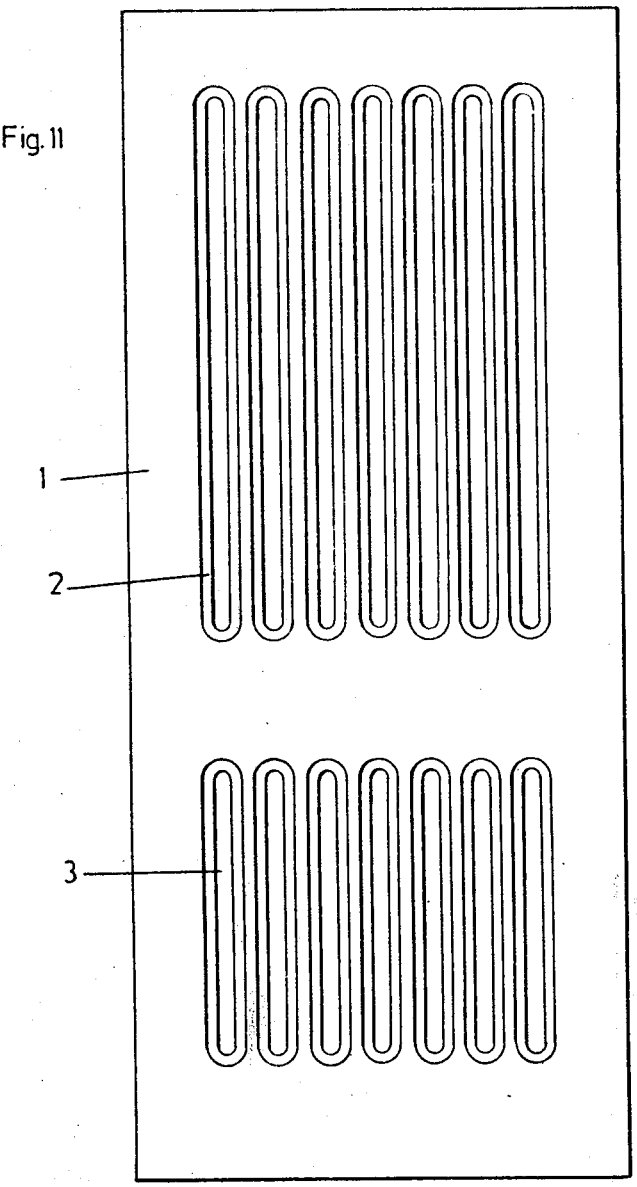
FIG. 11 is an elevation of a domestic external door.
Figure 12:
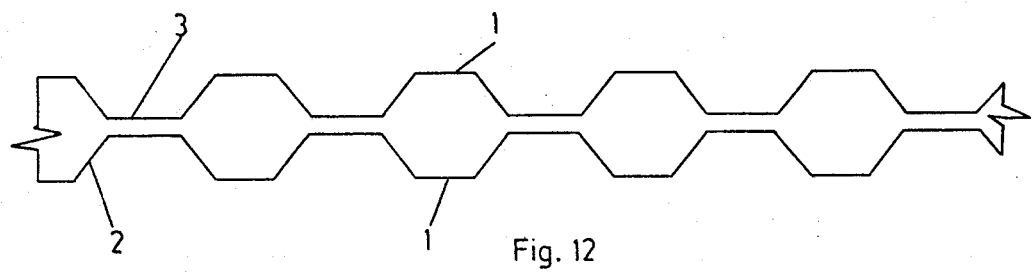
FIG. 12 is a sectioned outline along part of the line XII—XII of FIG. 11.

The sheet when removed from the press had a shape corresponding to the shape of the two dies, and is illustrated in FIGS. 11 and 12 of the drawings. The door had a smooth glossy surface 1 in which the cherry red colouration had the appearance of lying deep within a glazed layer. Embossed into the surface were two sets of seven parallel channels whose bevelled sides 2 had a deep-colouration appearance like that of the surface glaze. The base 3 of each channel was translucent and by contrasting with the remainder of the door area which was opaque, the translucent bases of the channels provided an interesting visual impact when back lit by daylight or by house lights in the evening. The door (requiring only the addition of the usual furniture such as lock, hinges etc.) had a hard precoloured glazed surface which was continuous with the hard precoloured glazed surface of the bevelled edges of the grooves, and this continuity of surface extended to include the integral translucent panels. The visual effect of this was the appearance of a strong unified and attractive structure.

The invention has been illustrated by specific designs of doors and other articles, but integral transparent panels of a wide variety of shapes may be incorporated into doors and other articles in a similar manner, merely by the replacement of the die plates by further plates carrying the required shape. Likewise also, colours other than the cherry red pigment of Example 7 may be used as required. Colours may also be applied to the surface of the panel by other means such as by transfer printing using sublimable dyestuffs, this being particularly suitable where intricate patterns are desired on kithen furniture, for example.

I claim:

1. A building element comprising at least one substantially opaque cellular sheet and at least one substantially non-cellular transparent or translucent panel in and integral with said sheet and in which the panel is an area which has been rendered non-cellular to provide its transparency or translucency, and wherein the sheet and panel are composed of a water-extended thermoplastic polymer, which has been subsequently substantially freed of water to provide the cells of the cellular structure.

2. A building element as claimed in claim 1 wherein the panel is an area of collapsed cellular structure of the cellular opaque sheet.

3. A building element according to claim 1 in the form of an office or domestic door, wherein the at least one sheet comprises a plurality of the integral panels to provide decorative transparent or translucent areas which allow light to pass through the door, the thermoplastic polymer comprising a thermoplastic homopolymer of methyl methacrylate or copolymer of methyl methacrylate.

4. An office or domestic door comprising at least one substantially opaque cellular sheet placed together with at least one sheet of a differing composition and having a plurality of substantially non-cellular decorative transparent or translucent panels in and integral with said sheets which allow light to pass through the door, said panels being areas which have been rendered non-cellular to provide the transparency or translucency and form a laminate of the two sheets of differing composition, and wherein the sheet and panel are composed of a water-extended thermoplastic homopolymer of methyl methacrylate or copolymer of methyl methacrylate which has been subsequently substantially freed of water to provide the cells of the cellular structure.

5. A door according to claim 4 in which the thermoplastic material is transparent but which contains sufficient filler to scatter the light passing through it and render it translucent.

6. A door according to claim 4 having on at least a part of its exposed surface, an integral noncellular skin.

7. A door according to claim 4 having two substantially parallel faces, wherein at least one of the panels is located intermediate the levels of said two faces.

8. A door according to claim 6 in which at least one of the panels is flush with and continuous with the non-cellular skin.

9. A door according to claim 4 in which at least one of the panels is embossed to a non-planar cross section.

10. A door according to claim 4 in which the two compositions differ in respect of their colour.

* * * * *

UNITED STATES PATENT OFFICE
CERTIFICATE OF CORRECTION

Patent No. 3,958,053　　　　　　　　Dated May 18, 1976

Inventor(s) James Ernest Ryan

It is certified that error appears in the above-identified patent and that said Letters Patent are hereby corrected as shown below:

On the cover sheet,

Please add:

--[30]　Foreign Application Priority Data

June 16, 1971　　Great Britain..........28212/71 --

Signed and Sealed this

Twenty-sixth Day of October 1976

[SEAL]
*Attest:*

RUTH C. MASON
*Attesting Officer*

C. MARSHALL DANN
*Commissioner of Patents and Trademarks*